(12) United States Patent
Amaral Costa et al.

(10) Patent No.: US 11,715,335 B2
(45) Date of Patent: Aug. 1, 2023

(54) AUTOMATED COMPUTATIONAL METHOD AND TOLLING SYSTEM FOR THE DETERMINATION OF THE VALIDITY OF THE PASSAGE OF A VEHICLE IN A TOLL

(71) Applicant: Atobe—Mobility Technology, S.A., São Domingos de Rana (PT)

(72) Inventors: André Amaral Costa, São Domingos de Rana (PT); Jerónimo Francisco Pérez Regidor, São Domingos de Rana (PT); João Nuno Andrade Ribeiro, São Domingos de Rana (PT)

(73) Assignee: ATOBE—MOBILITY TECHNOLOGY, S.A., São Domingos de Rana (PT)

( * ) Notice: Subject to any disclaimer, the term of this patent is extended or adjusted under 35 U.S.C. 154(b) by 0 days.

(21) Appl. No.: 17/207,681

(22) Filed: Mar. 21, 2021

(65) Prior Publication Data
US 2022/0254195 A1  Aug. 11, 2022

(30) Foreign Application Priority Data
Feb. 9, 2021  (PT) .......................... 117056

(51) Int. Cl.
*G07B 15/00* (2011.01)
*H04W 4/44* (2018.01)
(Continued)

(52) U.S. Cl.
CPC .......... *G07B 15/063* (2013.01); *G06V 20/54* (2022.01); *H04W 4/44* (2018.02); *H04W 4/80* (2018.02); *G06V 20/625* (2022.01); *G06V 30/10* (2022.01)

(58) Field of Classification Search
CPC ........ G07C 9/00; G06V 20/59; G06V 30/142; G06V 40/1365; G06V 10/40; G06V 20/62; G06V 30/10; G06F 16/29; G01S 19/51; G01C 21/00; H04L 67/12; H04L 9/32; H04L 63/0876; H04L 67/306; H04L 67/52; H04W 4/44; H04W 12/06; H04W 4/021;
(Continued)

(56) References Cited

U.S. PATENT DOCUMENTS 8,218,822 B2 * 7/2012 Sefton .................... G06V 20/52
                                                        382/104
9,911,245 B1 * 3/2018 Geist .................... G07B 15/063
(Continued)

*Primary Examiner* — Dionne Pendleton
(74) *Attorney, Agent, or Firm* — Mark M. Friedman

(57) ABSTRACT

The present disclosure is enclosed in the area of validation of vehicles in road tolls, which may also be designated as tolling systems. The present disclosure includes an automated computational method for the determination of the validity of the passage of a vehicle in a toll which includes two detection modes of a vehicle, through optical means and a mobile device receiving a wireless beacon with unique information associated with the toll and subsequently in connection with a remote backend server. The wireless beacon is a simple type of message which does not require that the mobile device and a fixed wireless device establish a connection. Such feature is one particularly relevant in the applications of the present disclosure, as it highly improves the efficacy of the receipt of the unique information associated with the toll by the mobile device. The present disclosure further includes a corresponding system.

16 Claims, 1 Drawing Sheet

(51) Int. Cl.
*G07B 15/06* (2011.01)
*H04W 4/80* (2018.01)
*G06V 20/54* (2022.01)
*G06V 20/62* (2022.01)
*G06V 30/10* (2022.01)

(58) Field of Classification Search
CPC ... H04W 4/80; G06Q 20/145; G06Q 2240/00; G06Q 10/10; G06Q 20/108; G06Q 40/02; G06Q 20/02; G06Q 20/085; G06Q 20/0855; G06Q 20/308; G06Q 20/3224; G06Q 20/326; G06Q 20/4015; G06Q 2220/00; G06Q 30/0283; G06Q 30/0284; G06Q 20/3278; G06Q 30/0185; G06K 7/10366; G07B 15/063; G07B 15/04; G07B 15/06; G07B 15/00; G05D 1/0246; G08G 1/04; G08G 1/133; G08G 1/096716; G08G 1/054; B60R 16/023
See application file for complete search history.

(56) References Cited

U.S. PATENT DOCUMENTS

| | | | |
|---|---|---|---|
| 10,691,904 B1* | 6/2020 | Randall | G06V 40/1365 |
| 2016/0300119 A1* | 10/2016 | Silva | G06F 16/248 |
| 2017/0286794 A1* | 10/2017 | Aoyama | G06V 10/98 |
| 2018/0121744 A1* | 5/2018 | Kim | G06V 10/993 |
| 2018/0211457 A1* | 7/2018 | Haworth | H04W 12/069 |
| 2019/0066492 A1* | 2/2019 | Nijhuis | G06V 20/52 |
| 2020/0311743 A1* | 10/2020 | Higuchi | G06Q 30/0185 |
| 2020/0327343 A1* | 10/2020 | Lund | H04W 4/46 |
| 2021/0248848 A1* | 8/2021 | Stagni | G07B 15/06 |
| 2022/0122452 A1* | 4/2022 | Alex | G06V 20/54 |

* cited by examiner

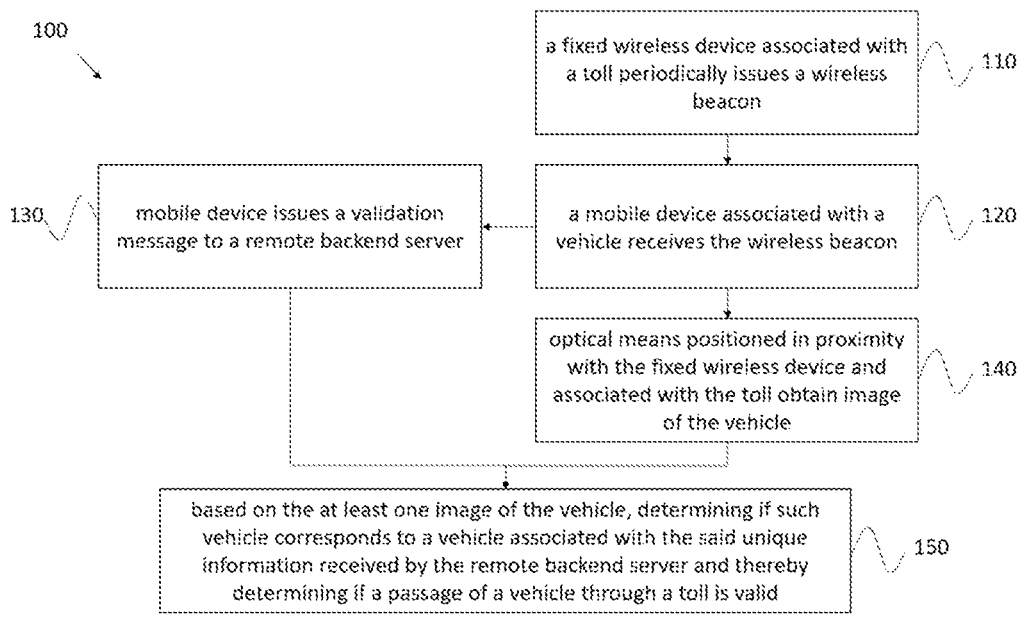

AUTOMATED COMPUTATIONAL METHOD AND TOLLING SYSTEM FOR THE DETERMINATION OF THE VALIDITY OF THE PASSAGE OF A VEHICLE IN A TOLL

FIELD OF THE DISCLOSURE

The present disclosure is enclosed in the area of validation of vehicles in road tolls, which may also be designated as tolling systems.

PRIOR ART

Solutions exist in the art where a vehicle which crosses a road toll is identified through artificial vision—namely including cameras. The images captured by a camera are automatically analysed and the license plate of the vehicle allows to determine the license plate number of the vehicle, thereby identifying the vehicle.

These systems are typically complemented with an application-specific device, containing a unique identifier, which is detected by a wireless reader associated with the toll when the vehicle crosses the toll. Such application specific devices are typically coupled to the windshield of the vehicles, to make sure that the reader is able to detect its presence.

These systems have as a premise that the user of the vehicle is registered before the highway operator, which directly charges the payment of the tolls and which runs the tolling system. If the vehicle is not registered with the highway operator, a fine or a charge corresponding to the fee and to an additional administrative cost is issued to the owner of the vehicle containing the license plate number detected by the artificial vision system, and the respective images captured by cameras may be digitally stored.

These systems have as an advantage that the users of the roads with tolls are directly identifiable by the tolling system owner, the highway operator, with which users are directly registered. On the other hand, the procedure of accessing to the system may hinder some users from registering, as the request of the referred application-specific device is required.

A further addition to the application-specific devices consists of systems in which a user of a vehicle crossing a toll subscribes a service with other third-party companies, other than the highway operator.

Such third-party companies receive the fees for payment issued by the highway operator in relation to a detected license plate number, and subsequently charge their subscriber. The subscriber/user is registered before the third-party as owner of the vehicle having such license plate number. The third-party company then charges an additional fee for its service.

These third-party-based systems have as an advantage that no application specific devices or registration with the highway operator are required. Yet, they are considerably more complex, involving more entities, and prone to fraud due to possible vulnerability in the registration of information before third-parties.

Moreover, these systems are entirely based on artificial vision, meaning that they are more prone to the respective issues, including failure in clearly reading a license plate number, be it due to bad condition of the plates, high speed of the vehicle or environmental conditions.

The present solution innovatively overcomes such issues in a non-obvious manner.

SUMMARY OF THE DISCLOSURE

In an aspect of the present disclosure, an automated computational method is provided.

In an embodiment, the present disclosure includes an automated computational method for the determination of the validity of the passage of a vehicle in a toll which comprises the steps of:
 a fixed wireless device associated with the toll periodically issuing a wireless beacon, the wireless beacon comprising a unique information associated with the toll,
 a mobile device receiving the wireless beacon, the mobile device being associated with a vehicle,
 the mobile device issuing a validation message to a remote backend server, the validation message comprising the unique information associated with the toll and a unique information associated with the respective vehicle,
 upon the passage of a vehicle through a toll, optical means associated with the toll obtaining at least one image of the vehicle, the optical means being positioned in proximity with the fixed wireless device, and based on the at least one image of the vehicle, determining if such vehicle corresponds to a vehicle associated with the said unique information received by the remote backend server and thereby determining if a passage of a vehicle through a toll is valid.

Two types of detection thereby occur. One detection is provided locally, through the optical means, which obtain at least one image of the vehicle. A vehicle is thereby identified in the place in which a tolling system may be provided, and a toll is to be charged. Furthermore, a mobile device associated with a vehicle receives the wireless beacon issued by the fixed wireless device and transmits or issues a validation message to a remote backend server. The remote backend server is associated with the fixed wireless device and the optical means, and thereby provides that a correspondence between information from the images obtained by the optical means and the information received at the remote backend server is provided. The information received at the remote backend server contains both a unique information—thus a unique identification—of the mobile device associated with the vehicle and a unique information associated with the toll—thus also a unique identification. Thus, two types of detection occur, and when a correspondence between the two is provided, it is determined that a passage of a vehicle through a toll is valid.

In an embodiment of the automated method, a valid passage may be regarded as the passage of a vehicle which has been previously registered in a database.

In another embodiment of the automated method, a valid passage may be regarded as the passage of a vehicle without the issue of a fine.

In the context of the present disclosure, a vehicle passing through a toll may mean passing in the vicinity of the toll, such that the respective means of the toll: the fixed wireless device and the optical means, are respectively able to issue a wireless beacon which is received by the mobile device and capture an image which contains and enables the identification of the vehicle associated with the mobile device.

By providing a mobile device which is able to receive a wireless beacon from a fixed wireless device associated with a toll, the method of the present disclosure allows to open the range of suitable mobile devices to devices such as smartphones or tablets, which are of a broader accessibility to users than application specific devices.

Furthermore, the wireless beacon issued by the fixed wireless device is a simple type of message which does not require that the mobile device and the fixed wireless device establish a connection. Such feature is particularly relevant in the applications of the present disclosure, as it highly improves the efficacy of the receipt of the unique information associated with the toll by the mobile device.

In addition, as the validation message is sent to the remote backend server directly by the mobile device, it i) does not require that the validation message is sent through the fixed wireless device, thereby further reducing the need of the establishment of a connection between the two, and ii) it may even be that the mobile device is momentarily not able to issue the validation message, for instance because no means are provided at the moment the passage through the toll, leaving such issue to a later moment. The method of the present disclosure thereby allows to operate in an offline (as regards the mobile device) mode.

In an embodiment, the validation message is issued by the mobile device to a remote backend by means of a cellular wireless network. Thus, in such embodiment and considering the case ii) above, it may be that no cellular wireless network is provided at the location of the fixed wireless device—typically the case in remote locations—, that the user/owner of the mobile device has a cellular wireless network plan with limited usage of data, and such limit has been reached, or simply that the mobile device has the cellular wireless network means associated with the mobile device switched off. Whichever is the case, the method of the present disclosure allows that the validation message is issued at a later stage.

The optical means are positioned in proximity with the fixed wireless device and thereby are considered to operate in respect to a same toll. It thereby provides that an identification in the optical means and the fixed wireless device refers to a same vehicle in a same toll, which is particularly relevant not only in single toll solutions but also in cases where a plurality of tolls in a channelled road or in an open road toll are provided.

In an embodiment, the optical means comprise at least one digital camera. The digital camera may take any form known in the art, provided it enables obtaining at least one image of the vehicle.

In another aspect of the present disclosure, a tolling system is provided.

In an embodiment, the tolling system of the present disclosure provides the determination of the validity of the passage of a vehicle in a toll and comprises:
- a fixed wireless device associated with the toll configured to periodically issuing a wireless beacon, the wireless beacon comprising a unique information associated with the toll,
- a remote backend server configured to receive a validation message from a mobile device associated with a vehicle, the validation message comprising a unique information associated with a toll and a unique information associated with the respective vehicle,
- optical means associated with the toll configured to obtain at least one image of the vehicle upon the passage of a vehicle through a toll, the optical means being positioned in proximity with the fixed wireless device, and the system comprising computational means which are further configured to, based on the at least one image of the vehicle, determine if such vehicle corresponds to a vehicle associated with the said unique information received by the remote backend server and thereby determine if a passage of a vehicle through a toll is valid.

The system of the present disclosure provides for the same advantages described above in respect of the method of the present disclosure.

DESCRIPTION OF FIGURES

FIG. 1—representation of an embodiment of the method (100) of the present disclosure, comprising the steps of:
- a fixed wireless device associated with the toll periodically issuing a wireless beacon, the wireless beacon comprising a unique information associated with the toll (110),
- a mobile device receiving the wireless beacon, the mobile device being associated with a vehicle (120),
- the mobile device issuing a validation message to a remote backend server, the validation message comprising the unique information associated with the toll and a unique information associated with the respective vehicle (130),
- upon the passage of a vehicle through a toll, optical means associated with the toll obtaining at least one image of the vehicle, the optical means being positioned in proximity with the fixed wireless device (140), and
- based on the at least one image of the vehicle, determining if such vehicle corresponds to a vehicle associated with the said unique information received by the remote backend server and thereby determining if a passage of a vehicle through a toll is valid (150).

DETAILED DESCRIPTION

The more general and advantageous configurations of the present disclosure are described in the Summary of the disclosure. Such configurations are detailed below in accordance with other advantageous and/or preferred embodiments of implementation of the present disclosure.

Several embodiments of the method of the present disclosure are subsequently described.

In an embodiment, a first license plate number of the vehicle is determined from the obtained at least one image of the vehicle and a second license plate number is determined from the unique information associated with the respective vehicle sent to the remote backend server, the first license number plate being compared to the second license plate number and thereby being determined if a passage of a vehicle through a toll is valid.

Such provides a simplified solution of determining if the vehicle which is actually passing through the toll and is identified through the optical means is in fact a known vehicle, and its passage through a toll is valid. Furthermore, and especially for cases in which the vehicle passes through the toll with a velocity higher than the desirable for artificial vision-based systems, errors may exist in the recognition of the license plate number from the at least one image. Other errors in the recognition of the license plate number may be associated with the bad condition of the plates or environmental conditions, such as fog, snow ice, rain or excess of sunlight. In artificial vision-based systems known in the art, such situations are typically solved by human verification of the images. The present solution, by providing a second and reliable manner of determining the license plate number of the vehicle (second license plate number) improves the reliability of the method and does not require such high-cost verification. Furthermore, in the most severe cases of issues in license plate number recognition, it may even happen that the license plate is illegible, even after human revision.

In an embodiment, the comparison between the first license plate number and the second license plate number comprises determining a similarity between the first license plate number and the second license plate number, the similarity comprising determining differences between alphanumeric characters in a same position of the first license plate number and the second license plate number.

In order to reliably implement an automatic determination of the correct license plate number in case of discrepancies, the above-described solution is provided. To accommodate eventual flaws in the license plate number recognition process using the optical means, the method of the present disclosure still allows to complete a validation procedure even where the first and second license plate numbers are not the same, i.e., where there is no 100% match between the license plate number obtained from the at least one image (first) and the license plate number obtained from the remote backend server (second). For example, if the difference between the first license plate number and the second license plate number is just of one character, such as an alphanumerical character, still the validation loop may be closed. The similarity degree or threshold may be tuned depending on the desired risk tolerance. Such may be adapted by a highway operator implementing the method of the present disclosure.

In an embodiment, the referred similarity degree or threshold between the two license plate numbers may be computationally determined through the determination of differences between a string associated with the first license plate number and a string associated with the second license plate number through the method of Levenshtein distance.

Thus, in an embodiment, and where the first license plate number and the second license plate number are different and the similarity is above a predefined threshold, a value of the second license plate number is altered to be equal to the first license plate number. It thereby consists of a simplified manner for determining which is the accepted/validated plate number.

In an embodiment, the validation message is issued to a remote backend by means of a cellular wireless network or, where the mobile device has no access to a cellular wireless network when of the passage of the associated vehicle in a toll, the validation message is issued when the mobile device regains access to a cellular wireless network or to a wireless local area network.

As previously referred, the method of the present disclosure may be provided such that the validation message is issued to a remote backend by means of a cellular wireless network.

Also, as previously referred, the method of the present disclosure allows that the mobile device is offline when of its passage through the toll to which optical means and a fixed wireless device are associated, i.e. the mobile device has no access to a cellular wireless network when of the passage of the associated vehicle in a toll. It thereby allows that, at a later stage, the validation message is issued when the mobile device regains access. Such access may be provided through a cellular wireless network or to a wireless local area network. It may be that the user/owner of the mobile device has a cellular wireless network plan with limited usage of data, and such limit has been reached. Thus, alternatively, the remote backend server may still receive the validation message through a wireless local area network.

In several alternative or cumulative embodiments, the cellular wireless network comprises or is compatible with the protocols of 2.5G GPRS, 2.75G EDGE, 3G, 4G or 5G. In an embodiment, the cellular wireless network may be compatible with other equivalent protocols.

In several alternative or cumulative embodiments, the wireless local area network comprises or is compatible with protocols of IEEE 802.11, preferably Bluetooth, Wi-Fi or Bluetooth Low Energy, or IEEE 802.15.4. In an embodiment, the wireless local area network may be compatible with other equivalent protocols.

In an embodiment, when no unique information received by the remote backend server is determined to correspond to information obtained from the at least one image of the vehicle, it is determined in a registration database if the information obtained from the at least one image of the vehicle corresponds to a known registered user. Such allows to, in the case that the vehicle identified through the images obtained by optical means is not corresponded by unique information received by the remote backend server, still an associated user may be identified.

In a respective embodiment, when a known registered user is determined, an automated notification is issued to an associated address, the automated notification containing information on payment of the toll associated with optical means.

In an embodiment, the mobile device is configured to leave from a low power mode to a detection mode upon the receipt of a notification associated with a territorial region. Such allows to save battery of a mobile device which runs through a battery, which is particularly relevant in a mobile solution as is the case of the present disclosure, as it avoids that the mobile device is constantly waiting to receive a beacon from the fixed wireless device. Such change from a low power mode into a so-called detection mode may be referred to as a wake-up action of the mobile device.

In an embodiment, the notification associated with a territorial region is issued upon receipt of a message compliant with the iBeacon protocol.

In an additional embodiment, the message compliant with the iBeacon protocol is transmitted by an upwind fixed device, the upwind fixed device being positioned such that the vehicle passes through a vicinity of the upwind fixed device prior to passing through a vicinity of the said fixed wireless device. The upwind fixed device may thereby be installed in a location of the toll road which is upwind of the fixed wireless device, considered the normal flow of traffic through such road. Thus, considering that the vehicle and respective mobile device are moving along such normal flow of traffic, the vehicle and respective mobile device will pass through the upwind fixed before passing through the fixed wireless device and respective optical means. This solution thereby allows to cause the mobile device to leave a low power mode into a detection mode, in which the mobile device is able to receive the wireless beacon from the fixed wireless device. This solution allows that the mobile device is in a low power mode in which a reception mode is not on at all times.

In an alternative embodiment, the notification associated with a territorial region is issued upon the determination by the mobile device that its present position is in within a predefined region associated with the toll. Such solution is location based, and thereby allows the mobile device to operate autonomously in its wake-up action. In addition, the method of the present disclosure may further comprise so-called geofences, i.e. predefined regions/virtual areas of territory associated with the toll which the mobile device recognizes as in the vicinity of the toll, thereby leading to the change into a detection mode.

In several alternative embodiments, the determination of the present position of the mobile device is determined by means of a radionavigation-satellite service, preferably Global Positioning System (GPS), GALILEO, GLONASS, BeiDou or NavIC. In an embodiment, the radionavigation-satellite service may be compatible with other equivalent protocols.

In an embodiment, no communication protocol connection is established between the mobile device and the fixed wireless device. Such allows for a more reliable obtainment of the unique information associated with the toll by the mobile device, as it allows that a much shorter message—a beacon—is issued by the fixed wireless device and thereby received by the mobile device. The establishment of a connection would require the usage of higher-level layers of a communication protocol, which are more prone to errors considering that the vehicle is moving. Furthermore, the establishment of a connection requires more time (also due to requiring long frames to be exchanged between the devices), which may not be available for higher speeds of the vehicle/mobile device.

In an embodiment the vehicle is an automotive or motorized vehicle, and the toll is associated with the access to a road.

In an embodiment, the method comprises a plurality of fixed wireless devices and a corresponding plurality of optical means, each associated with a different toll of a plurality of tolls in a channelled road or in an open road toll, wherein each of the fixed wireless devices has a unique information associated with the respective toll which is different from the unique information associated with the respective toll of the other fixed wireless devices. It thereby allows to determine the passage of vehicles through plurality of tolls, and yet each toll identifying the vehicle respectively passing through it. In particular, each toll has associated optical means, which allow to determine whether a vehicle is passing through such toll. As the validation message may be sent to the remote backend server irrespective of the actual time and location of the mobile device (the present disclosure even covers offline mode), a valid passage of the vehicle may still be identified, if correspondence occurs.

Several embodiments of the system of the present disclosure are subsequently described.

In one or more embodiments, the system of the present disclosure is configured to implement the method of the present disclosure, in any of its embodiments.

In an embodiment of the system, the computational means are further configured to i) determine a first license plate number of the vehicle from the obtained at least one image of the vehicle, and to ii) determine a second license plate number from the unique information associated with the respective vehicle received by the remote backend server, the computational means being further configured to compare the first license number plate with the second license plate number and thereby determine if a passage of a vehicle through a toll is valid.

Such provides a simple solution of determining if the vehicle which is actually passing through the toll and is identified through the optical means is in fact a known vehicle, and its passage through a toll is valid. Furthermore, and especially for cases in which the vehicle passes through the toll with a velocity higher than the desirable for artificial vision-based systems, errors may exist in the recognition of the license plate number from the at least one image. Other errors in the recognition of the license plate number may be caused by the bad condition of the plates or environmental conditions, such as fog, snow ice, rain or excess of sunlight. In artificial vision-based systems known in the art, such situations are typically solved by human verification of the images. The present solution, by providing a second and reliable manner of determining the license plate number of the vehicle (second license plate number) improves the reliability of the method and does not require such high-cost verification.

In another embodiment of the system, the computational means are further configured such that the comparison between the first license plate number and the second license plate number comprises determining a similarity between the first license plate number and the second license plate number, the similarity comprising determining differences between alphanumeric characters in a same position of the first license plate number and the second license plate number.

In an embodiment, the computational device may be further configured to determine the referred similarity degree or threshold between the two license plate numbers through the determination of differences between a string associated with the first license plate number and a string associated with the second license plate number through the method of Levenshtein distance.

In order to reliably implement an automatic determination of the correct license plate number in case of discrepancies, the above-described solution is provided. To accommodate eventual flaws in the license plate number recognition process using the optical means, the method of the present disclosure still allows to close the validation even where the first and second license plate numbers are not the same, i.e., where there is no 100% match between the license plate number obtained from the at least one image (first) and the license plate number obtained from the remote backend server (second). For example, if the difference between the first license plate number and the second license plate number is just of one character, such as an alphanumerical character, still the validation loop may be closed. The similarity degree or threshold may be tuned depending on the desired risk tolerance. Such may be adapted by a highway operator implementing the method of the present disclosure.

Thus, in an embodiment of the system, the computational means are further configured to, where the first license plate number and the second license plate number are different and the similarity is above a predefined threshold, alter a value of the second license plate number to be equal to the first license plate number.

In an embodiment of the system, it further comprises a registration database and the computational means are further configured to, when no unique information received by the remote backend server is determined to correspond to information obtained from the at least one image of the vehicle, further determine in the registration database if the information obtained from the at least one image of the vehicle corresponds to a known registered user. Such allows to, in the case that the vehicle identified through the images obtained by optical means is not corresponded by unique information received by the remote backend server, still an associated user may be identified.

In an embodiment of the system, the computational means are further configured to, when a known registered user is determined, issue an automated notification to an address associated with the known registered user, the automated notification containing information on payment of the toll associated with optical means.

In an embodiment of the system, it further comprises an upwind fixed device, the upwind fixed device being configured to issue a message compliant with the iBeacon protocol, wherein such message compliant with the iBeacon protocol is such that, upon its receipt, it provides for a mobile device to leave from a low power mode to a detection mode. This solution thereby allows to cause the mobile device to leave a low power mode into a detection mode, in which the mobile device is able to receive the wireless beacon from the fixed wireless device. This solution allows that the mobile device is in a low power mode in which a reception mode is not on at all times.

In an embodiment of the system, it further comprises a plurality of fixed wireless devices and a corresponding plurality of optical means, each of such fixed wireless devices and corresponding optical means being configured to be associated with a different toll of a plurality of tolls in a channelled road or in an open road toll, wherein each of the fixed wireless devices has a unique information associated with the respective toll which is different from the unique information associated with the respective toll of the other fixed wireless devices. It thereby allows to determine the passage of vehicles through plurality of tolls, and yet each toll identifying the vehicle respectively passing through it.

In another aspect, the present disclosure may include a second embodiment of an automated computational method for the determination of the validity of the passage of a vehicle in a toll which comprises the steps of:
  optionally, a mobile device being associated with a vehicle leaving from a low power mode to a detection mode upon the receipt of a notification associated with a territorial region,
  the mobile device establishing a connection with a fixed wireless device associated with the toll, the fixed wireless device being configured with a unique information associated with the toll,
  subsequently, the mobile device sending a wireless message to the fixed wireless device associated with the toll, the message comprising a unique information associated with the respective vehicle,
  upon receipt of the wireless message, the fixed wireless device issuing a validation message to a remote backend server, the validation message comprising the unique information associated with the toll and a unique information associated with the respective vehicle,
  upon the passage of a vehicle through a toll, optical means associated with the toll obtaining at least one image of the vehicle, the optical means being positioned in proximity with the fixed wireless device, and based on the at least one image of the vehicle, determining if such vehicle corresponds to a vehicle associated with the said unique information received by the remote backend server and thereby determining if a passage of a vehicle through a toll is valid.

Two types of detection thereby occur. One detection is provided locally, through the optical means, which obtain at least one image of the vehicle. A vehicle is thereby identified in the place in which a tolling system may be provided, and a toll is to be charged. Furthermore, a fixed wireless device associated with the toll receives the message issued by the mobile device and transmits or issues a validation message to a remote backend server. The remote backend server is associated with the fixed wireless device and the optical means, and thereby provides that a correspondence between information from the images obtained by the optical means and the information received at the remote backend server is provided. The information received at the remote backend server contains both a unique information—thus a unique identification—of the mobile device associated with the vehicle and a unique information associated with the toll—thus also a unique identification. Thus, two types of detection occur, and when a correspondence between the two is provided, it is determined that a passage of a vehicle through a toll is valid.

In an embodiment, a valid passage may be regarded as the passage of a vehicle which has been previously registered in a database.

In another embodiment, a valid passage may be regarded as the passage of a vehicle without the issue of a fine.

In the context of the present disclosure, a vehicle passing through a toll may mean passing in the vicinity of the toll, such that the respective means of the toll: the fixed wireless device and the optical means, are respectively able to receive a wireless message which is issued by the mobile device and capture an image which contains and enables the identification of the vehicle associated with the mobile device.

By providing a mobile device which is able to issue a wireless message to be received by a fixed wireless device associated with a toll, the second method of the present disclosure allows to open the range of suitable mobile devices to devices such as smartphones or tablets, which are of a broader accessibility to users than application specific devices.

Furthermore, the wireless message issued by the mobile device is a simple type of message which still requires that the mobile device and the fixed wireless device establish a connection. Such feature is particularly relevant in the applications of the present disclosure, as it highly improves the efficacy of the receipt of the unique information associated with the toll by the mobile device when the vehicle associated with the mobile device travels at a speed which allows a successful receipt of the wireless message by the fixed wireless device.

In addition, as the validation message is sent to the remote backend server directly by the fixed wireless device, it allows that the mobile device is not able to connect through another type of network, such as a cellular network, for instance because no such means are provided. The method of the present disclosure thereby allows to operate in an offline (as regards the mobile device) mode.

In an embodiment, the validation message is issued by the fixed wireless to a remote backend by means of a suitable network protocol, such as a cabled connection or a cellular wireless network. Thus, it may be that the mobile device has no access to a wireless network such as a cellular wireless network, being particularly suitable for remote locations or situations in which the user/owner of the mobile device has a cellular wireless network plan with limited usage of data, and such limit has been reached, or simply that the mobile device has the cellular wireless network means associated with the mobile device switched off. Whichever is the case, the second method of the present disclosure allows that the validation message is issued at a later stage.

The optical means are positioned in proximity with the fixed wireless device and thereby are considered to operate in respect to a same toll.

In an embodiment, the optical means comprise at least one digital camera.

In another aspect of the present disclosure, a second embodiment of a tolling system is provided.

In an embodiment, the tolling system of the present disclosure provides the determination of the validity of the passage of a vehicle in a toll and comprises:
  a remote backend server,
  a fixed wireless device associated with the toll and configured to
    receive a wireless message from a mobile device, the wireless message comprising a unique information associated with a vehicle,
    upon receipt of the wireless message, issue a validation message directed to the remote backend server, the validation message comprising the unique information associated with the toll and a unique information associated with the respective vehicle, optical means associated with the toll configured to obtain at least one image of the vehicle upon the passage of a vehicle through a toll, the optical means being positioned in proximity with the fixed wireless device, and the system comprising computational means which are further configured to, based on the at least one image of the vehicle, determine if such vehicle corresponds to a vehicle associated with the said unique information received by the remote backend server and thereby determine if a passage of a vehicle through a toll is valid.

The second system of the present disclosure provides for the same advantages described above in respect of the method of the present disclosure.

Although the present disclosure is mainly described in terms of methods and systems, the person skilled in the art understands that it is also directed to various devices or apparatuses, such as a mobile device, a fixed wireless device, optical means, a backend server and/or computational equipment, such as a computer or a set of computers, which implement or embody said methods and systems. Such devices or apparatuses may be connected by means of communication networks, which may be wireless or wired.

The mobile device, the fixed wireless device, the optical means, and/or the backend server include components to perform at least some of the example features and features of the methods described, whether through hardware components (such as memory and/or processor), software or any combination thereof.

An article for use with the mobile device, the fixed wireless device, the optical means, and/or the backend server, such as a pre-recorded storage device or other similar computer-readable medium, including program instructions recorded on it, or a computer data signal carrying readable program instructions computer can direct a device to facilitate the implementation of the methods described herein. It is understood that such apparatus, articles of manufacture and computer data signals are also within the scope of the present disclosure.

A "computer-readable medium" means any medium that can store instructions for use or execution by a computer or other computing device, including read-only memory (ROM), erasable programmable read-only memory (EPROM) or flash memory, random access memory (RAM), a portable floppy disk, a drive hard drive (HDD), a solid state storage device (for example, NAND flash or synchronous dynamic RAM (SDRAM)), and/or an optical disc such as a Compact Disc (CD), Digital Versatile Disc (DVD) or Blu-Ray™ Disc.

As will be clear to one skilled in the art, the present disclosure should not be limited to the embodiments described herein, and a number of changes are possible which remain within the scope of the present disclosure.

Of course, the preferred embodiments shown above are combinable, in the different possible forms, being herein avoided the repetition all such combinations.

The invention claimed is:

1. A tolling system for the determination of the validity of the passage of a vehicle in a toll characterised in that it comprises:

a fixed wireless device associated with the toll configured to periodically issuing a wireless beacon, the wireless beacon comprising a unique information associated with the toll, a remote backend server configured to receive a validation message from a mobile device associated with a vehicle, the validation message comprising a unique information associated with a toll and a unique information associated with the respective vehicle, optical means associated with the toll configured to obtain at least one image of the vehicle upon the passage of a vehicle through a toll, the optical means being positioned in proximity with the fixed wireless device, and the system comprising computational means which are further configured to, based on the at least one image of the vehicle, determine if such vehicle corresponds to a vehicle associated with the unique information received by the remote backend server and thereby determine if a passage of a vehicle through a toll is valid;

wherein the validation message is issued to the remote backend by means of a cellular wireless network or, where the mobile device has no access to a cellular wireless network when of the passage of the associated vehicle in a toll, the validation message is issued when the mobile device regains access to a cellular wireless network or to a wireless local area network;

wherein the computational means are further configured to i) determine a first license plate number of the vehicle from the obtained at least one image of the vehicle, and to ii) determine a second license plate number from the unique information associated with the respective vehicle received by the remote backend server, the computational means being further configured to compare the first license number plate with the second license plate number and thereby determine if a passage of a vehicle through a toll is valid; and wherein the computational means are further configured such that the comparison between the first license plate number and the second license plate number comprises determining a similarity between the first license plate number and the second license plate number, the similarity comprising determining differences between alphanumeric characters in a same position of the first license plate number and the second license plate number and/or the computational means are further configured to, where the first license plate number and the second license plate number are different and the similarity is above a predefined threshold, alter a value of the second license plate number to be equal to a value of the first license plate number.

2. The system according to claim 1 wherein the system further comprises a registration database and the computational means are further configured to, when no unique information received by the remote backend server is determined to correspond to information obtained from the at least one image of the vehicle, further determine in the registration database if the information obtained from the at least one image of the vehicle corresponds to a known registered user.

3. The system according to claim 2 wherein the computational means are further configured to, when a known registered user is determined, issue an automated notification to an address associated with the known registered user, the automated notification containing information on payment of the toll associated with optical means and/or it further comprises an upwind fixed device, the upwind fixed device being configured to issue a message compliant with the iBeacon protocol, wherein such message compliant with the iBeacon protocol is such that, upon its receipt, it provides for a mobile device to leave from a low power mode to a detection mode.

4. The system according to claim 1 wherein it further comprises a plurality of fixed wireless devices and a corresponding plurality of optical means, each of such fixed wireless devices and corresponding optical means being configured to be associated with a different toll of a plurality of tolls in a channelled road or in an open road toll, wherein each of the fixed wireless devices has a unique information associated with the respective toll which is different from the unique information associated with the respective toll of the other fixed wireless devices.

5. An automated computational method for the determination of the validity of the passage of a vehicle in a toll characterised in that it comprises the steps of:
- a fixed wireless device associated with the toll periodically issuing a wireless beacon, the wireless beacon comprising a unique information associated with the toll,
- a mobile device receiving the wireless beacon, the mobile device being associated with a vehicle,
- the mobile device issuing a validation message to a remote backend server, the validation message comprising the unique information associated with the toll and a unique information associated with the respective vehicle,
- upon the passage of a vehicle through a toll, optical means associated with the toll obtaining at least one image of the vehicle, the optical means being positioned in proximity with the fixed wireless device, and
- based on the at least one image of the vehicle, determining if such vehicle corresponds to a vehicle associated with the said unique information received by the remote backend server and thereby determining if a passage of a vehicle through a toll is valid, and
- wherein the validation message is issued to a remote backend by means of a cellular wireless network or, where the mobile device has no access to a cellular wireless network when of the passage of the associated vehicle in a toll, the validation message is issued when the mobile device regains access to a cellular wireless network or to a wireless local area network;
- wherein a first license plate number of the vehicle is determined from the obtained at least one image of the vehicle and a second license plate number is determined from the unique information associated with the respective vehicle sent to the remote backend server, the first license number plate being compared to the second license plate number and thereby being determined if a passage of a vehicle through a toll is valid; and
- wherein the comparison between the first license plate number and the second license plate number comprises determining a similarity between the first license plate number and the second license plate number, the similarity comprising determining differences between alphanumeric characters in a same position of the first license plate number and the second license plate number and/or where the first license plate number and the second license plate number are different and the similarity is above a predefined threshold, a value of the second license plate number is altered to be equal to a value of the first license plate number.

6. The method according to claim 5 wherein the cellular wireless network comprises 2.5G GPRS, 2.75G EDGE, 3G, 4G or 5G, and/or the wireless local area network comprises a protocol compliant with IEEE 802.11, preferably Bluetooth, Wi-Fi or Bluetooth Low Energy, or IEEE 802.15.4.

7. The method according to claim 5 wherein, when no unique information received by the remote backend server is determined to correspond to information obtained from the at least one image of the vehicle, determining in a registration database if the information obtained from the at least one image of the vehicle corresponds to a known registered user.

8. The method according to claim 7 wherein, when a known registered user is determined, an automated notification is issued to an associated address, the automated notification containing information on payment of the toll associated with optical means.

9. The method according to claim 5 wherein the mobile device is configured to leave from a low power mode to a detection mode upon the receipt of a notification associated with a territorial region.

10. The method according to claim 9 wherein the notification associated with a territorial region is issued upon receipt of a message compliant with the iBeacon protocol.

11. The method according to claim 10 wherein the message compliant with the iBeacon protocol is transmitted by an upwind fixed device, the upwind fixed device being positioned such that the vehicle passes through a vicinity of the upwind fixed device prior to passing through a vicinity of the said fixed wireless device.

12. The method according to claim 9 wherein the notification associated with a territorial region is issued upon the determination by the mobile device that its present position is in within a predefined region associated with the toll.

13. The method according to claim 12 wherein the determination of the present position of the mobile device is determined by means of a radionavigation-satellite service, preferably Global Positioning System (GPS), GALILEO, GLONASS, BeiDou or NavIC.

14. The method according to claim 5 wherein no communication protocol connection is established between the mobile device and the fixed wireless device.

15. The method according to claim 5 wherein the vehicle is an automotive or motorized vehicle, and the toll is associated with the access to a road.

16. The method according to claim 5, wherein it comprises a plurality of fixed wireless devices and a corresponding plurality of optical means, each associated with a different toll of a plurality of tolls in a channelled road or in an open road toll, wherein each of the fixed wireless devices has a unique information associated with the respective toll which is different from the unique information associated with the respective toll of the other fixed wireless devices.

* * * * *